United States Patent [19]

Greene

[11] Patent Number: 5,405,102
[45] Date of Patent: Apr. 11, 1995

[54] FOLDAWAY AIRCRAFT AIR VANE

[75] Inventor: Leonard M. Greene, Scarsdale, N.Y.

[73] Assignee: Safe Flight Instrument Corporation, White Plains, N.Y.

[21] Appl. No.: 562,221

[22] Filed: Aug. 3, 1990

[51] Int. Cl.$^6$ .................. B64D 47/00; G01C 21/00
[52] U.S. Cl. .................. 244/1 R; 73/180; 244/49; 244/87; 244/121; 441/79; 416/2
[58] Field of Search .................. 244/1 R, 120, 121, 49, 244/87, 82; 73/180, 182, 188, 147; 441/79; 114/127, 132, 140; 416/2

[56] References Cited

U.S. PATENT DOCUMENTS

| | | | |
|---|---|---|---|
| 1,293,381 | 2/1919 | Dupuy | 416/2 |
| 2,699,065 | 1/1955 | Blair | 73/180 |
| 3,082,623 | 3/1963 | Bosland | 73/182 |
| 3,744,927 | 7/1973 | Bernaerts | 416/2 |
| 4,087,062 | 5/1978 | Masclet | 244/100 R |
| 4,398,485 | 8/1983 | Diziere | 441/79 |
| 4,901,566 | 2/1990 | Boetsch | 73/188 |

FOREIGN PATENT DOCUMENTS 3801747 8/1989 Germany .................. 441/79

Primary Examiner—Galen L. Barefoot
Attorney, Agent, or Firm—Edward A. Sokolski

[57] ABSTRACT

An aerodynamic vane is mounted on the fuselage of an aircraft for purposes such as sensing the angle of attack of an aircraft. The vane is attached to a fuselage mounting hub by means of a deformable hinge member and a weakened linear portion of the vane which is designed to give way under the force of impact of an object striking the vane. Should an object such as a bird strike the vane, the vane will separate from the hub along the weakened linear portion without the main body of the vane shattering. The hinge member, while it will deform under the impact, retains the vane to the fuselage so that it cannot fly into the engine or otherwise cause damage to the aircraft.

4 Claims, 1 Drawing Sheet

FOLDAWAY AIRCRAFT AIR VANE

BACKGROUND OF THE INVENTION

1. Field of the Invention

This invention relates to "wind" vanes which are mounted on the fuselage of an aircraft for such purposes as sensing the angle of attack of an aircraft and more particularly to such a vane which is constructed so that when struck by a flying object and broken, it will be retained to the aircraft fuselage and will tend not to shatter.

2. Description of the Related Art

Wind vanes are commonly mounted on the fuselages of aircraft to measure such parameters as the angle of attack of the aircraft. In its protruding position in the airstream, such vanes are subject to being struck by birds and other objects. If such a vane is struck by sufficient force to cause it to shatter or break off, it presents the hazzard of entering the engine or striking against parts along the fuselage which could cause the engine to fail or cause other serious damage. A particular problem is presented in this regard in that such vanes are generally mounted near the nose of the aircraft from where there is a stronger risk of a broken off vane entering the engine. No prior art aircraft vane constructions for obviating this problem are known to applicant. While involved in an unrelated art, the problem presented when highway posts are struck by vehicles and fly into oncoming traffic is at least somewhat analogous in nature. This problem is recognized in U.S. Pat. No. 3,912,404 to Herbert L. Katt and U.S. Pat. No. 4,071,970 to Richard A. Strizki. In Katt, a highway post is described in which a frangible coupling is employed such that on impact, the frangible coupling is broken and a tie strip prevents the broken off post sections from flying loose. In Strizki, a highway post is made with a weakened line portion which operates in conjunction with a hinge such that when struck, the post will break off at the weakened portion yet is retained to its base portion by the hinge. There is no suggestion in either of these references of an aircraft angle of attack vane which is constructed so that it will not fly free of the aircraft fuselage or shatter under high impact.

SUMMARY OF THE INVENTION

The present invention obviates the aforementioned problems encountered with prior art aircraft "wind" vanes by providing a vane structure which when subjected to high impact will separate along a weakened line at its attachment to the aircraft fuselage and bend about a hinge member which is part of its mounting structure without becoming detached from the fuselage. This end result is achieved by fabricating the vane with a strong but deformable "hinge" which is used to attach a vane to the aircraft fuselage. The portions of the vane attached to the fuselage along a line running up from the hinge are weakened so that they will give way under impact before the main body of the vane. Thus, when the vane is struck by an object such as a bird, it will tend to break along the weakened portion with the hinge bending yet retaining the vane to the fuselage.

It is therefore an object of this invention to prevent a wind vane from presenting a hazzard by being broken free from an aircraft fuselage.

Other objects of the invention will become apparent from the following description in connection with the accompanying drawings.

DETAILED DESCRIPTION OF THE INVENTION

Figure 1:
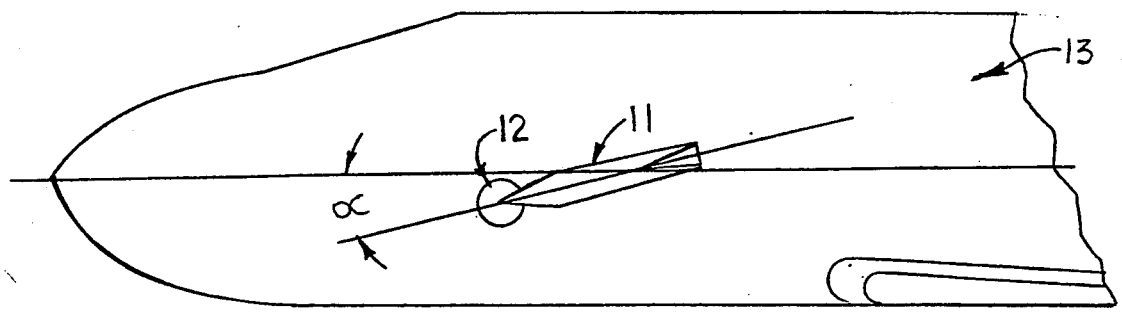
FIG. 1 is a side elevational view showing the device of the invention mounted on the fuselage of an aircraft.
Figure 2:
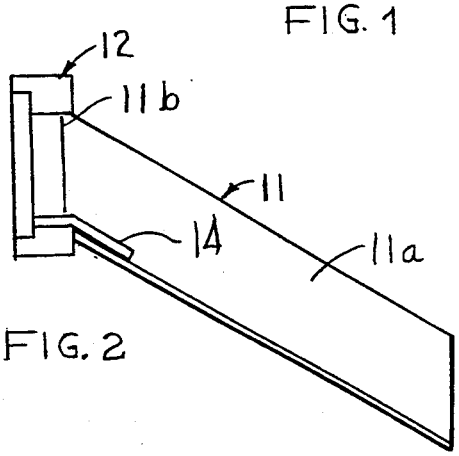
FIG. 2 is a side elevational view of a preferred embodiment of the invention.

Referring to FIG. 1, the device of the invention is shown installed on the fuselage of an aircraft. Vane 11 may comprise an angle of attack vane which is attached to the fuselage of aircraft 13 through mounting hub 12. The main body portion 11a of the vane is typically made of a durable material to withstand the abrasive effect of the airflow. Hub 12 is fabricated of an impact resisting material, while the hinge member 14 is fabricated of a ductile material designed to withstand normal aerodynamic loading. Hinge member 14 is attached to vane 11 and to hub 12. A linear seam 11b is formed in the vane where it joins to the hub directly above hinge 14 to provide a weakened break away line in the vane.

Figure 3:
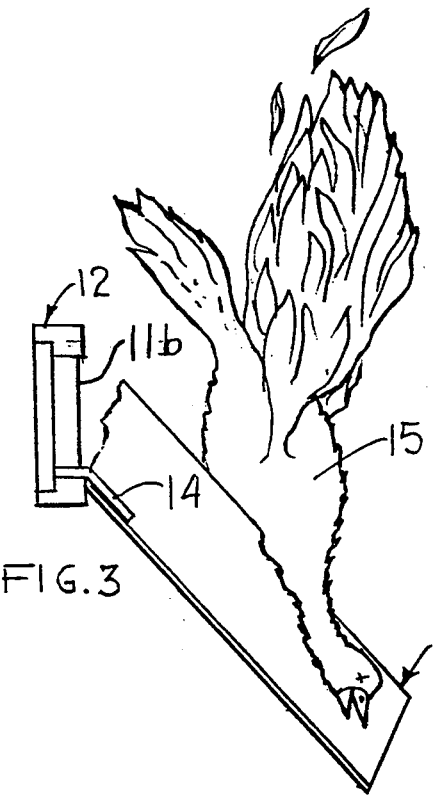
FIG. 3 illustrates a bird striking the vane of the invention.
Figure 4:
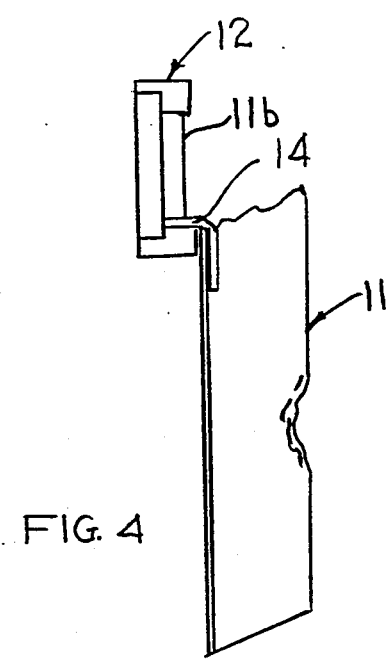
FIG. 4 illustrates the vane in its final retained position.

When a bird 15 strikes the vane, as shown in FIG. 3, the vane breaks away from hub 12 along seam line 11b and the vane moves in response to the force with hinge 14 bending as shown in FIG. 4. The body of the bird thus moves free of the vane, the vane being bent over with hinge 14 and retained to the hub by such hinge. The weakened seam allows the vane to give way under the impact of the bird so as to avoid its fracturing or splintering.

While the invention has been described and illustrated in detail, it is to be clearly understood that this is intended by way of illustration and example only and is not to be taken by way of limitation, the scope of the invention being limited only by the terms of the following claims:

I claim:

1. In a vane member mounted on the fuselage of an aircraft, a mounting structure for attaching said vane to the fuselage comprising:

a deformable hinge member fixedly attached to said vane said hinge member being attached to said fuselage, and a weakened portion of said vane adjacent to said hinge member.

whereby when said vane is struck by an object and subjected to a high impact, it will break along said weakened portion with said hinge member deforming in response to the impact while retaining said vane to the fuselage.

2. The vane member of claim 1 wherein said weakened portion is linear and runs substantially at right angles from the longitudinal axis of said hinge member.

3. The vane member of claim 1 wherein said deformable hinge member is fabricated of a deformable material.

4. The vane member of claim 1 and further including a hub member mounted on said fuselage, said vane member being attached to said hub member.

* * * * *